United States Patent Office 3,518,223
Patented June 30, 1970

1

3,518,223
POLY(ORGANOTIN)MERCAPTIDE POLYMERS
AND RESINS STABILIZED THEREWITH
Joseph Fath and Donald L. Deardorff, Barrington, R.I., assignors, by mesne assignments, to Teknor Apex Company, a corporation of Delaware
No Drawing. Filed July 26, 1966, Ser. No. 568,061
Int. Cl. C08f 45/62
U.S. Cl. 260—45.75                                8 Claims

ABSTRACT OF THE DISCLOSURE

Polyvinyl halide resins are stabilized against thermal discoloration and degradation by incorporating as a stabilizer poly(dialkyltin)mercaptide polymer.

This invention relates to novel organotin bearing condensation polymers useful in the stabilization of resins derived from ethylenically unsaturated compounds and to the resin compositions produced by the incorporation of this stabilizer. The organotin bearing condensation polymers may be differently described as poly(dialkyltin) mercaptide polymers.

It is well known that polyvinyl chloride, its copolymers, and many other vinyl halide based resins are subject to degradation and discoloration at the elevated temperatures needed for processing, and even under normal conditions and usage beyond the manufacturing stage. A large variety of compounds are now known which are effective in preventing this discoloration for relatively long periods of time. Among these stabilizer compounds, organotin derivatives have proven to be some of the most desirable. Examples of these organotin derivatives are found in U.S. Pats. 2,648,650 and 2,801,258. These patents disclose processes by which diubutyltin mercaptides are derived from the reaction of simple mercaptans, such as lauryl mercaptan, or simple mercaptoesters, with an organotin compound.

The present invention provides an improved stabilizing composition for use in the stabilization of polyvinyl halide resins. By polyvinyl halide resins, we mean to include such resins as are obtained by polymerizing such monomers as vinyl chloride, vinyl fluoride, vinylidene chloride, trifluoroethylene, tetrafluoroethylene, either alone or with copolymerizable monomers such as vinyl acetate, ethyl acrylate, acrylonitrile, etc.

The stabilizing composition is a condensation polymer containing repeating groups of the general structural formula

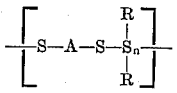

where each R is a hydrocarbon moiety containing up to 12 carbon atoms and can be alkyl, cycloalkyl, aryl, or alkaryl and A is a polyfunctional organic radical having certain further characteristics hereinafter described in greater detail. It will suffice at this point to state that the polyfunctional organic radical A is derived from a polyol containing more than two hydroxy groups wherein more than one has been esterified with a mercapto acid and all or part of the remaining have been esterified with a sulfur free organic acid. The resulting condensation polymer can therefore be widely varied in its structure to permit it to possess valuable properties, such as controlled lubricity and fusion time, and oxidative and light stability. At the same time, the polymeric nature of these structures provides relatively lower volatility and odor, both highly desirable characteristics, especially during processing of the stabilizer compounds. Moreover, the stabilizers of the present invention exhibit excellent thermal stability when compounded, processed, etc.

From the foregoing description of the invention, it will have become apparent that a major object of the invention is to provide improved tin containing stabilizing compositions for use in polyvinyl halide resins to prevent or retard thermal degradation of such resins.

Another and more specific object of the invention is to provide an improved stabilizer composition for polyvinyl halide polymers and copolymers, which composition contains active organotin groups condensed with novel polyfunctional mercaptoesters.

Another object of the invention is to provide, as a stabilizer of polyvinyl halide resins and polyvinyl halide copolymers, a poly(dialkyltin) mercaptide condensation polymer which possesses a polyfunctionality allowing numerous variations in the structure of the stabilizers so as to impart certain desirable properties, while fully retaining the thermal stability characteristic commonly attributed to the presence of the organotin group.

An additional object of the invention is to provide a novel composition of matter useful as an intermediate in the preparation of highly effective stabilizing materials for stabilizing resins derived from vinyl halides.

A further object of the invention is to provide an organotin-containing stabilizing composition for vinyl halide resins, which composition is generally less volatile than the organotin type stabilizers heretofore provided.

Additional objects and advantages will become apparent upon reading the following detailed description of the invention, and referring to the appended examples of its practice.

The condensation polymers of the present invention are prepared by reacting an organotin compound, such as a dialkyl organotin oxide, or a salt thereof, with certain polyfunctional sulfur bearing compounds which are broadly designated as (polymercapto) esters. The esters can best be defined by their mode of derivation. First, they are derived from polyhydric alcohols containing more than two hydroxyl groups. These alcohols are esterified with mercapto acids containing a sulfhydryl and a carboxylic acid group. In the esterification reaction, at least one of the hydroxyl groups are not so esterified. The hydroxyl groups not esterified with mercapto acid can then be esterified with a selected carboxylic acid, or may in whole or in part be left essentially unesterified. The esters thus formed may be broadly represented by the structure

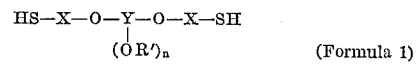

(Formula 1)

where $n$ is a number generally of from one to, and including, six, (preferably 1 to 4), X is a substituted acyl radical, and Y is a poly substituted hydrocarbon moiety (preferably containing up to 12 carbon atoms) in which R′ is selected from the group consisting of hydrogen, and acyl radicals. Thus, the mercaptoesters can be either mixed esters or partial esters, containing in either case sulfhydryl groups for subsequent condensation with organotin compounds.

The (polymercapto) esters impart great versatility to the organotin bearing condensation polymers made therefrom since the non-sulfur bearing moiety of the (polymercapto) esters can give selected compounds varying widely in process characteristics, or possibly even containing residues which promote light stabilizing characteristics, improve lubricity, etc.

After formation of the complex esters, they are reacted with an organotin compound to form condensation polymers which are the stabilizing compounds of the invention. The stabilizing compounds are then incorporated in the vinyl resins which they are to stabilize to provide improved, highly stabilized resinous compositions.

Since, as has been indicated, the stabilizer compositions of the invention are formed by the reaction of organotin compounds with certain (polymercapto) esters, the latter compounds will initially be described in detail. These (polymercapto) esters are mixed esters and are believed to be novel compositions of matter, and their polyfunctionality plays an important role in the achievement of the objects of this invention. The term polyfunctionality is here intended to connote the presence both of a plurality of sulfhydryl groups, permitting subsequent condensation with the organotin compounds, and also at least one hydroxyl group, partially or wholly esterified.

The described polyfunctionality is achieved in preparing the (polymercapto) esters by reacting polyhydric alcohols containing more than two hydroxyl groups with mercapto acids containing a sulfhydryl group as well as a carboxylic acid group. The polyhydric alcohols used are preferably aliphatic polyols, containing from about 3 to about 10 carbon atoms. Examples of suitable alcohols which can be employed are trimethylolpropane, pentaethythritol, di-pentaerythritol, trimethylolethane, glycerine, 1,2,6-hexanetriol, sorbitol, 1,3,5-pentanetriol, 1,5,8-octanetriol, 4-ethyl-1,4,8-octanetriol and 3-butyl-1,2,6-heptanetriol. The mercapto acids used are preferably aliphatic compounds, and are most preferably mercaptoalkanoic acids containing from about 1 to about 6 carbon atoms. Examples of suitable mercapto acids for use in the reaction are mercaptoacetic acid (thioglycolic acid), 3-mercaptopropionic acid, and 4-mercaptobutyric acid.

In carrying out the esterification reaction to produce the described polyfunctional mercaptoester, it is essential that the number of hydroxyl groups furnished by the polyol molecule exceed that of the number of carboxylic groups furnished by the mercapto acid. In this way the unreacted hydroxyl groups can be reserved for the purpose of tailoring the properties of the mercaptoester, either by not further reacting the reserved hydroxyl groups at all, or by esterifying them, or some of them, with selected carboxylic acids. Thus, for example, a hydroxyl not esterified by the mercapto acids can, if desired, be esterified by such carboxylic acids as pelargonic acid, 2-ethylhexanoic acid, lauric acid, coconut fatty acids, butyric acid, benzoic acid, para-toluic acid, para-tertiary butylbenzoic acid, salicyclic, iso-decanoic acid, stearic acid, and decanoic acid. The reaction products of the esterification reaction will constitute equilibrium mixtures which are subsequently suitable for further condensation to produce the tin bearing polymers.

It can readily be seen that the presence of non-sulfur bearing functional groups permits a wide variety of compounds to be produced, and their properties and characteristics to be selectively controlled so as to permit the stabilizers to accomplish certain functions when incorporated in the resinous materials to be stabilized. Thus, for instance, by varying the chain length of the carboxylic acid used to esterify the reserve hydroxyl groups, and by using carboxylic acids of a fatty nature, an ultimate stabilizing composition can be produced that has a high degree of lubricity.

The final complex mercaptoesters thus contemplated for subsequent reaction with organotin compounds to produce the condensation polymer stabilizing compositions of the invention can be represented by the structural Formula 1

$$\text{HS}-\text{X}-\text{O}-\underset{(\text{OR}')_n}{\text{Y}}-\text{O}-\text{X}-\text{SH}$$

where $n$ is a number from 1 to 6, X is a substituted acyl radical, and is preferably derived from an alkanoic acid containing from about 1 to about 6 carbon atoms, and Y is a poly substituted hydrocarbon moiety preferably containing up to 12 carbon atoms and in which R′ is selected from the group consisting of hydrogen, and acyl radicals. Examples of esters of this type are:

trimethylolpropane monopelargonate di(thioglycolate)
trimethylolpropane monopelargonate di(3-mercaptopropionate)
trimethylolpropane monopelargonate di(4-mercaptobutyrate)
pentaerythritol monopelargonate di(thioglycolate)
pentaerythritol monopelargonate di(3-mercaptopropionate)
glycerol monohexanoate di(thioglycolate)
trimethylolpropane monobutyrate di(thioglycolate)
1,2,6-hexanetriol di(thioglycolate)
sorbitol monobutyrate monobenzoate di(4-mercaptobutyrate)
pentaerythritol monopelargonate di(4-mercaptobutyrate)
pentaerythritol di(pelargonate) di(thioglycolate)
pentaerythritol monopelargonate monobenzoate di(thioglycolate)
pentaerythritol monopelargonate monosalicylate di(thioglycolate)
glycerol monopelargonate di(thioglycolate)

The mercaptoesters can be prepared by conventional esterification procedures. In the examples of ester preparation hereinafter appearing, an appropriate polyhydric alcohol and the desired acids are reacted by heating them together in the presence of an inert organic solvent. The water produced in the reaction is continuously removed and the reaction is continued until all of the water is removed. The reaction may be catalyzed with strong acids such as sulfuric acid, p-toluene sulfonic acid and methanesulfonic acid. The (polymercapto) esters may be recovered by removing solvent and excess acids with heating and under reduced pressure, and they may be further reacted in situ as hereinafter described to give the desired poly(tinmercaptide) derivative.

The complex mercaptoesters are reacted with organotin compounds to form condensation polymers which we have determined to possess great value as stabilizers for polymers derived from vinyl halide resins. The preferred organotin compounds used in the preparation of the stabilizers are dialkyltin oxides and most preferably, those in which the alkyl substituents contain from about 4 to about 8 carbon atoms. In addition to the dialkyltin oxides, dialkyltin hydroxides, dialkyltin halides and acetates can also be utilized. The condensation reaction occurring between the mercaptoesters and dialkyltin oxide compounds can be illustrated in a broad and general sense by the following equation:

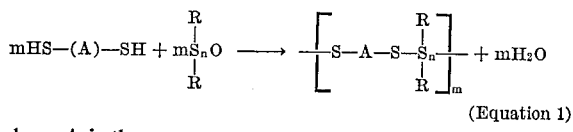

(Equation 1)

where A is the group

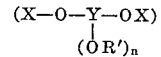

of Formula 1, $m$ is a positive integer determined by the stoichiometry of the reactants employed and the chain length of the condensation polymer produced, and each R is an alkyl radical, preferably of 4 to 8 carbon atoms.

From the foregoing equation, it will be seen that the product of the reaction is a true condensation polymer, the structure and composition of which are specifically defined by the stoichiometry and multiplicity of the reaction system. It can thus be seen that if approximately equal molar ratios of the two bifunctional reactants are used, as indicated in Equation 1, very high molecular weight condensation polymers can be produced. While being functional or operative insofar as the practice of this invention is concerned, such high molecular weight substances often have the disadavntage of being extremely viscous, or semi-solid, and having a nondefinitive termination. For this reason, it is frequently desirable and advantageous to terminate the condensation polymers in a manner analogous to common practice in plasticizer technology. The termination can be accomplished by the use of monofunctional sulfur-bearing or carboxylic acid groups as indicated in Equations 2 and 3:

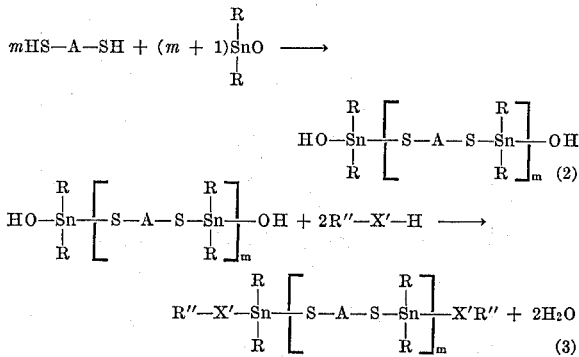

where A is the group

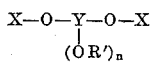

hereinbefore defined in reference to Equation 1, R and $m$ have the meanings hereinbefore established, X' is selected from the group consisting of S and

and R'' is selected from the group consisting of alkyl, aryl, alkylene carboxyalkyl or alkylene carboxyalkoxyaryl radicals. By the use of such termination procedure, additional species of condensation polymers can be generated which have lower molecular weights by virtue of the termination, and which also have lower viscosities, and are more readily controllable during actual production. In addition to the reduction in the molecular weight of the polymers produced, the use of the termination procedure permits further variation in the properties and performance characteristics of the condensation polymers since a variety of terminating agents can be utilized. Terminating agents may, for example, be chosen from carboxylic acid, alkyl or aryl mercaptans and a number of monofunctional mercaptoesters. Preferred terminating agents include, but are not limited to, lauryl mercaptan, $C_{11}-C_{14}$ n-alkyl mercaptans, tetradecyl mercaptans, stearyl mercaptan, butyl thioglycolate, phenoxyethyl thioglycolate, isooctyl thioglycolate, hexyl mercaptopropionate, phenoxy ethyl mercaptopropionate, benzyl mercaptopropionate, lauryl thioglycolate, pelargonic acid, benzoic acid, and other acids enumerated herein for use in the esterification procedure to produce the mercaptoesters.

It is to be noted that while the terminated condensation polymers are the preferred stabilizing compositions of the invention due to the additional processing advantages they impart and incur, the invention is not limited to such terminated polymers, but also encompasses the broader concept of condensation polymers which are not terminated, and have a very wide range of relatively higher molecular weights.

Among the preferred stabilizing compositions of the invention are those derived from dibutyltin oxide, pentaerythritol, pelargonic acid and mercaptopropionic acid, such as, for example, poly(dibutyltin) [pentaerythritol (pelargonate) (mercaptopropionate)] (phenoxyethylmercaptopropionate).

The stabilizing agents are prepared by heating the (polymercapto) ester and an appropriate terminating agent (if one is used as per reactions (2) and (3)) with the selected organotin compound. The reaction can be conveniently carried out in the presence of an inert organic solvent which facilitates the removal of water formed during the reaction. The reaction may be, but is not necessarily, conducted in the presence of acid catalysts. The poly (mercaptide) condensation polymer products are recovered by filtration of any solid material which may be present and removal of the solvent by heating under reduced pressure. As has previously been indicated, the (polymercapto) ester may be converted in situ to the condensation polymer stabilizing agent, that is, all the reactions can be performed in a single reaction vessel.

The following examples are presented in order to illustrate the manner in which the novel (polymercapto) esters of the invention are prepared, and to further illustrate the manner in which these esters are converted to stabilizing compositions useful in the stabilization of resins.

EXAMPLE 1

Preparation of trimethylolpropane monopelargonate di(thioglycolate)

Trimethylolpropane, 268 grams, and pelargonic acid, 316 grams, were condensed in the presence of refluxing benzene at 180° C. until the theoretical amount of water of condensation was removed. Mercaptoacetic acid, 470 grams, was added and the mixture refluxed at 140° C. When removal of water of condensation was complete, benzene and excess acids were removed by vacuum distillation. The product had a specific gravity of 1.110 at 25° C., color of 30 APHA, viscosity at 25° C. of 71.6 cs. and was found to contain 15.1 weight percent mercaptan sulfur.

EXAMPLE 2

Preparation of pentaerythritol monohydroxy monopelargonate di(thioglycolate)

A mixture of 158 grams technical grade pentaerythritol (containing 88 percent by weight mono and 12 percent dipentaerythritol), 184 grams thioglycolic acid and 158 grams pelargonic acid was heated in the presence of refluxing benzene until all water of condensation was removed. Volatile components were removed under reduced pressure to give an oil product having a specific gravity of 1.083 at 25° C., viscosity of 77.2 cs. at 25° C., color of 70 APHA and containing 14.6 percent by weight mercaptan sulfur.

EXAMPLE 3

Preparation of trimethylolpropane monopelargonate di(mercaptopropionate)

A mixture of 268 grams trimethylolpropane and 316 grams pelargonic acid was heated five hours at 180° C. in the presence of refluxing benzene. Mercaptopropionic acid, 475 grams, was added and reflux continued at 160° C. until the theoretical amount of water of condensation was collected. Benzene and excess acids were removed under reduced pressure to leave 833 grams oil product containing 13.8 percent by weight mercaptan sulfur. Specific gravity 25° C.=1.0830; viscosity, 25° C.=77 cs.; color= 70 APHA.

EXAMPLE 4

Preparation of pentaerythritol monohydroxy monopelargonate di(mercaptopropionate)

A mixture of 148 grams technical pentaerythritol (containing 88 percent mono and 12 percent dipentaerythritol), 158 grams pelargonic acid and 212 grams mercaptopropionic acid was heated at 140° C. in the presence of refluxing benzene until all water of condensation was removed. Volatile components were removed under reduced pressure to give 449 grams of an oil product which contained 13.8 percent by weight mercaptan sulfur. Specific gravity at 25° C.=1.1360; viscosity at 25° C.=302 cs.

EXAMPLE 5

Preparation of (pentaerythritol)$_{1.0}$(pelargonate)$_{2.0}$ (mercaptopropionate)$_{1.6}$ A 500 ml. flask equipped with thermometer and nitrogen sparge tube was charged with 68.5 grams pentaerythritol, 158 grams pelargonic acid, 88 grams mercaptopropionic acid, 100 grams benzene. The mixture was refluxed at 95 to 150° C. for twelve hours. Benzene was removed under reduced pressure. A pale yellow oil product remained having a mercaptan sulfur content of 9.13 percent by weight. Specific gravity at 25° C.=1.140.

EXAMPLE 6

Preparation of poly(dibutyltin)$_{1.0}$(trimethylolpropane monopelargonate dithioglycolate)$_{1.0}$ The polymercaptoester of Example 1 (231 grams) was heated with 124 grams of dibutyltin oxide at 100° C. in the presence of refluxing benzene. After three hours time all water of reaction had been removed. Benzene was removed under reduced pressure to leave 333 grams of a viscous yellow oil product. Specific gravity at 25° C.=1.142. Tin content, calculated=17.2 weight percent.

EXAMPLE 7

Preparation of poly(dibutyltin)$_{2.0}$[trimethylolpropane monopelargonate di(thioglycolate)]$_{1.0}$(lauryl mercaptan)$_{2.0}$ Polymercaptoester of Example 1 (118 grams) was heated along with 124 grams of dibutyltin oxide and 103 grams of a C$_{12.4}$ primary n-alkyl mercaptan for four hours at 100° C. in the presence of refluxing benzene. Removal of water was complete after two hours. The mixture was filtered and benzene removed under reduced pressure to leave a slightly viscous yellow residue product. Tin content=17.3 weight percent, calculated.

EXAMPLE 8

Preparation of poly(dibutyltin)$_{2.0}$[pentaerythritol monohydroxy-monopelargonate di(thioglycolate)]$_{1.0}$(lauryl mercaptan)$_{2.0}$ A quantity of pentaerythritol monohydroxy monopelargonate di(thioglycolate), (113 grams), was heated three hours at 100° C. along with 124 grams of dibutyltin oxide and 103 grams of a C$_{12.4}$ primary n-alkyl mercaptan in the presence of refluxing benzene. Removal of water of reaction was complete after two hours. Filtration and removal of benzene by heating under reduced pressure left a lightly viscous and yellow residue product with specific gravity at 25° C. of 1.130 and tin content of 18.2 percent by weight.

EXAMPLE 9

Preparation of poly(dibutlytin)$_{2.0}$[trimethylolpropane monopelargonate di(thioglycolate)]$_{1.0}$(lauryl thioglycolate)$_{2.0}$ A quantity of trimethylolpropane monopelargonate di(thioglycolate), (118 grams), was mixed with 124 grams of dibutyltin oxide and 133 grams of lauryl thioglycolate and heated at 100° C. for three hours in the presence of refluxing benzene. Removal of water was complete after two hours reaction time. Removal of benzene by heating under reduced pressure left a yellow oil residue product with specific gravity at 25° C. of 1.068. Tin content=17.2 percent by weight.

EXAMPLE 10

Preparation of poly(dibutyltin)$_{2.0}$[pentaerythritol monohydroxy monopelargonate di(thioglycolate)]$_{1.0}$(lauryl thioglycolate)$_{2.0}$ Polymercaptoester from Example 2 (113 grams) was mixed with 124 grams of dibutyltin oxide and 133 grams lauryl thioglycolate and heated at 100° C. for three hours in the presence of refluxing benzene. Removal of water was complete after two hours. Benzene was removed by heating under reduced pressure and the product filtered to give a light yellow oil residue product with a specific gravity at 25° C. of 1.140. Tin content=16.4 percent by weight, calculated.

EXAMPLE 11

Prepartion of poly(dibutyltin)$_{2.0}$[trimethylolpropane monopelargonate di(mercaptopripionate)]$_{1.0}$(lauryl thithioglycolate)$_{2.0}$ A quantity of trimethylolpropane monopelargonate di(mercaptopropionate), (46.3 grams), was mixed with 49.6 grams of dibutyltin oxide and 53.4 grams of lauryl thioglycolate and the whole heated for two hours at 100° C. in the presence of refluxing benzene. Removal of water was complete after one hour. Benzene was removed by heating under reduced pressure. Filtration left an oil product with viscosity at 25° C. of 363 cs. Specific gravity at 25° C.=1.040. Tin content=12.6 weight percent.

EXAMPLE 12

Preparation of poly(dibutyltin)$_{2.0}$[pentaerythritol monohydroxy monopelargonate di(mercaptopropionate)]$_{1.0}$ (lauryl thioglycolate)$_{2.0}$ A quantity of pentaerythritol monohydroxy monopelargonate di(mercaptopriopionate), (47.9 grams), was mixed with 49.6 grams of dibutyltin oxide and 53.4 grams of lauryl thioglycolate and the whole heated for 2.5 hours at 100° C. in the presence of refluxing benzene. Removal of water was complete after one hour. The product was filtered and benzene removed by heating under reduced pressure to leave a light colored oil. Viscosity at 25° C.= 404 cs., specific gravity at 25° C.=1.10, tin content =17.2 weight percent (calculated=15.8 percent).

EXAMPLE 13

Preparation of poly(dibutyltin)$_{2.0}$[pentaerythritol monohydroxy monopelargonate di(mercaptopropionate)]$_{1.0}$ (lauryl thioglycolate)$_{2.0}$(toluene-2, 4-diisocyanate)$_{0.6}$ In a separate experiment, 42 grams of Example 12 product were combined with 3 grams toluene diisocyanate and heated in a nitrogen atmosphere at 100° C. for thirty minutes. The product was a very viscous and pale yellow oil.

EXAMPLE 14

Preparation of poly(dibutyltin)$_{2.0}$[trimethylolpropane monopelargonate di(mercaptopropionate)]$_{1.0}$(isooctylthioglycolate)$_{2.0}$ A quantity of trimethylolpropane monopelargonate di(mercaptopropionate), (46.3 grams), was mixed with 49.6 grams of dibutyltin oxide and 41.5 grams of isooctylthioglycolate and the whole heated for two hours at 100° C. in the presence of refluxing benzene. Removal of water was complete after one hour. Filtration and removal of benzene by heating under reduced pressure left a colorless oil residue product. Viscosity at 25° C.=155 cs., specific gravity at 25° C.=1.10. Tin content=18.1 percent by weight.

EXAMPLE 15

Pereparation of poly(dibutyltin)$_5$[trimethylolpropane monopelargonate di(mercaptopropionate)]$_4$ A quantity of trimethylolpropane monopelargonate di(mercaptopropionate), (116 grams), was mixed with 74.4 grams of dibutyltin oxide and heated at 100° C. for three hours in the presence of refluxing benzene. Removal of water was complete after one hour. The product was filtered and benzene removed by heating under reduced pressure. The residue product was viscous and slightly yellow. Tin content—19.5 percent calculated.

EXAMPLE 16

Preparation of poly(dibutyltin)$_4$[trimethylolpropane monopelargonate di(mercaptopropionate)]$_{3.0}$(isooctylthioglycolate)$_2$ A quantity of trimethylolpropane monopelargonate di(mercaptopropionate), (69.5 grams), was mixed with 49.6 grams of dibutyltin oxide, 21 grams of isooctylthioglycolate and the whole heated at 100° C. for three hours in the presence of refluxing benzene. Removal of water was complete after 1.5 hours. Benzene was removed by heating under reduced pressure and the product filtered to give a viscous oil with specific gravity at 25° C. of 1.181. Tin content=17.2 percent calculated.

EXAMPLE 17

Preparation of poly(dibutyltin)$_{2.0}$ [trimethylolpropane monopelargonate di(thioglycolate)]$_{1.0}$ (lauryl thioglycolate)$_{2.0}$ A quantity of trimethylolpropane monopelargonate di(thioglycolate), (240 grams), was combined with 248 grams of dibutyltin oxide, 267 grams of lauryl thioglycolate and the mixture heated at 100° C. for 2.5 hours. The product was filtered and benzene removed by heating under reduced pressure, leaving a viscous oil with specific gravity at 25° C. of 1.120. Tin content=19.08 weight percent.

EXAMPLE 18

Preparation of poly(dibutyltin)$_{2.0}$ [trimethylolpropane monopelargonate di(thioglycolate)]$_{1.0}$ (isooctylthioglycolate)$_{2.0}$ A quantity of trimethylolpropane monopelargonate di(thioglycolate), (42.5 grams) was combined with 49.5 grams dibutyltin oxide, 84 grams isooctylthioglycolate and the mixture heated at 94° C. for four hours in the presence of refluxing benzene. Removal of water was complete after one hour. Filtration and removal of benzene by heating under reduced pressure left a very pale yellow oil. Tin content=13.6 weight percent, calculated. Specific gravity at 25° C.=1.100.

EXAMPLE 19

Preparation of poly(dibutyltin)$_{1.0}$ [pentraerythritol dipelargonate di(thioglycolate)]$_{1.0}$ A 500 ml. three-neck flask fitted with thermometer and nitrogen sparge tube was charged with 68.5 grams pentaerythritol, 158 grams pelargonic acid, 83 grams thioglycolic acid, 100 ml. benzene and 0.5 gram methane sulfonic acid. The mixture was refluxed and water of condensation removed for 9.5 hours at 95° to 150° C. After cooling the flask, 132 grams of dibutyltin oxide was added and heating at 115° C. continued for nine hours. Removal of water was complete after three hours reaction time. Benzene was removed by heating under reduced pressure leaving a lightly viscous and slightly yellow product. Calculated tin content is 11.9 weight percent.

EXAMPLE 20

Preparation of poly(dibutyltin)$_{4.0}$ [pentaerythritol (pelargonate)$_{2.0}$ (mercaptopropionate)$_{1.6}$]$_{5.0}$ A quantity of pentaerythritol$_{1.0}$ pelargonate$_{2.0}$ mercaptopropionate$_{1.6}$, (100 grams), was combined with 35.4 grams dibutyltin oxide and the mixture heated at 100° C. for 2.5 hours in the presence of refluxing benzene. Water was removed as formed. Benzene was removed, after filtration, by heating under reduced pressures, to give a viscous oil product, specific gravity at 25° C.=1.140. Tin content=12.5 percent (calculated).

EXAMPLE 21

Preparation of poly(dibutyltin)$_{1.7}$ [pentaerythritol pelargonate)$_{2.0}$ (mercaptopropionate)$_{1.6}$]$_{1.0}$ (isooctylthioglycolate)$_{1.7}$ A quantity of (pentaerythritol)$_{1.0}$ (pelargonate)$_{2.0}$ (mercaptopropionate)$_{1.6}$, (126 grams), was combined with 95.7 grams dibutyltin oxide and the mixture heated at 100° C., in the presence of refluxing benzene. Water was removed as formed. After five hours, the mixture was cooled, 81 grams of isooctylthioglycolate were added and reflux at 100° C. continued for two hours. Benzene was removed by heating under reduced pressure and the residue filtered to give a pale yellow product. Specific gravity at 25° C.=1.090. Tin content=15.9 percent calculated.

In order to compare the stabilizing effectiveness of the mercaptide condensation polymers of the present invention with a reference stabilizing material of the organotin type widely used in industry prior to this invention, oven tests of polyvinyl chloride resin stabilized with the various stabilizing compositions were conducted. Simple poly(vinyl chloride) formulations containing polyvinyl chloride homopolymer, the stabilizer and mineral oil lubricant were premixed in a Hobart mixer and milled for five minutes at 325° F. on a two roll differential speed mill. The resin was then sheeted off and samples of the sheets were compared in thermal stability by heating at 400° F. in a circulating air oven. Samples were removed for visual comparison at 10 minute intervals. Progressive thermal degradation was indicated by a progressive darkening from a very slightly yellow color to black. The results of these oven tests are set forth in Table I.

TABLE I

| Compound composition | | | Oven stability tests,[3] minutes at 400° F. | | | | |
|---|---|---|---|---|---|---|---|
| Example [1] No. | Parts | PVC [2] Parts | Mineral oil | 10 | 20 | 30 | 40 | 50 |
| 6 | 2.0 | 100 | 1.5 | VSY | SY | B | | |
| 7 | 2.2 | 100 | 1.5 | | VSY | Y | B | |
| 8 | 2.0 | 100 | 1.5 | | VSY | Y | B | |
| 9 | 2.0 | 100 | 1.5 | | | SY | B | |
| 10 | 2.0 | 100 | 1.5 | VSY | SY | Y | B | |
| 11 | 2.2 | 100 | 1.5 | SY | Y | Y | B | |
| 12 | 2.0 | 100 | 1.5 | SY | Y | Y | B | |
| 13 | 2.0 | 100 | 1.5 | SY | Y | Y | B | |
| 14 | 2.0 | 100 | 1.5 | SY | Y | Y | B | |
| 15 | 2.0 | 100 | 1.5 | | VSY | SY | Y | B |
| 16 | 2.0 | 100 | 1.5 | | VSY | SY | Y | B |
| 17 | 2.0 | 100 | 1.5 | | VSY | Y | B | |
| 18 | 2.0 | 100 | 1.5 | SY | Y | B | | |
| 19 | 3.0 | 100 | 1.5 | | SY | B | | |
| 20 | 2.0 | 100 | 1.5 | Y | Y | B | | |
| 21 | 2.0 | 100 | 1.5 | VSY | SY | Y | B | |
| Reference [4] | 2.0 | 100 | 1.5 | VSY | SY | Y | B | |

[1] Refers to the condensation polymers produced in the several examples hereinbefore set forth.
[2] Refers to simple poly(vinyl chloride) homopolymer formulation used in the tests.
[3] In the oven tests, degrees of thermal degradation have been evidenced by VSY=very slightly yellow, SY=slightly yellow, Y=yellow, and B=black.
[4] The reference stabilizing composition used was dibutyltin -S,S-bis(isooctylthioglycolate).

EXAMPLE 22

Preparation of poly(dibutyltin)$_{2.0}$(pentaerythritol pelargonate benzoate dithioglycolate)$_{1.0}$(isooctylthioglycolate)$_{2.0}$ A reaction mixture containing 136 grams pentaerythritol, 158 grams pelargonic acid, 122 grams benzoic acid and 233 grams thioglycolic acid was heated at 135° C. in the presence of 0.5 gram p-toluene sulfonic acid catalyst and sufficient benzene to give reflux and efficient removal of water formed during the reaction. After nine hours, all water of reaction was removed. Excess acids were removed by reduced pressure distillation and washing of the residue with aqueous sodium carbonate. Drying with vacuum and heat left a yellow oil with specific gravity at 25° C of 1.178. Mercaptan sulfur content= 15.75 weight percent.

A portion of this product (83 grams) was combined with 100 grams dibutyltin oxide and 82 grams isooctylthioglycolate and the resulting mixture heated for two hours at 100° C. in the presence of refluxing benzene. The product was filtered and benzene removed by heating under reduced pressure to give 254 grams of a light yellow oil with specific gravity at 25° C. of 1.186. Calculated tin content=18.2 weight percent.

EXAMPLE 23

Preparation of poly(dibutyltin)$_{1.4}$[(pentaerythritol)$_{1.0}$ (pelargonate)$_{1.75}$(mercaptopropionate)$_{1.75}$]$_{1.0}$(isooctylthioglycolate)$_{0.8}$ A reaction mixture containing 148 grams pentaerythritol, 192.5 grams mercaptopropionic acid and 276.5 grams pelargonic acid was heated at 185° C. in the presence of refluxing benzene. All water of reaction was removed. Volatiles were removed by nitrogen sparge and reduced pressure to leave 550 grams of a pale yellow oil containing 10.7 weight percent mercaptan sulfur.

A portion of this product (212 grams) was combined with 124 grams dibutyltin oxide, 63 grams isooctylthioglycolate and heated for two hours at 100° C. in the presence of refluxing benzene. Removal of water was complete after one hour. Benzene was removed by heating under reduced pressure and the product filtered to give a viscous yellow oil with viscosity at 25° of 858 cs. and specific gravity at 25° C. of 1.15. Calculated tin content=15.1 weight percent.

EXAMPLE 24

Preparation of poly(dibutyltin)$_{2.0}$[trimethylolpropane pelargonate di(thioglycolate)]$_{1.0}$(phenoxyethylthioglycolate)$_{2.0}$ A mixture of 110 grams trimethylolpropane monopelargonate di(thioglycolate), 124 grams dibutyltin oxide, and 105 grams phenoxyethylthioglycolate was heated for three hours at 100° C. in the presence of refluxing benzene. During this time, 9 ml. of water was removed from the reaction. Removal of benzene by means of reduced pressure and nitrogen purge left 338 grams of a viscous yellow oil with specific gravity of 25° C. of 1,257. Calculated tin content=17.8 weight percent.

EXAMPLE 25

Preparation of poly(dibutyltin)$_{2.0}$trimethylolpropane pelargonate di(thioglycolate)$_{1.0}$(isooctylthioglycolate)$_{2.0}$ A mixture of 125 grams dibutyltin oxide, 110 grams trimethylolpropane monopelargonate di(thioglycolate) and 102 grams isooctylthioglycolate was heated for two hours at 105° in the presence of refluxing benzene. During that time, 7 ml. of water was removed from the reaction. Evaporation of benzene and filtration of the residue left 328 grams of a pale yellow oil product. Calculated tin content=18.1 weight percent.

EXAMPLE 26

Preparation of (pentaerythritol)$_{1.0}$(pelargonate)$_{2.0}$ mercaptopropionate)$_{1.6}$ A three-liter flask equipped with thermometer, and nitrogen sparge tube was charged with 444 grams pentaerythritol, 596 grams mercantopropionic acid, 950 grams pelargonic acid and 100 grams benzene. The flask was attached to an esterification apparatus, consisting of a column, Dean Stark water separator and total-reflux condenser. Heat was applied to the kettle and the benzene concentration adjusted to give reflux and efficient removal of water at 180° C. kettle temperature. Reaction was continued at that temperature for twelve hours. Benzene was removed with vacuum to leave 1790 grams residue product. Excess acid was removed by steam distillation and the product dried with vacuum to leave a pale yellow oil polymercaptoester product containing 9.72 percent by weight mercaptan sulfur.

EXAMPLE 27

Preparation of poly(dibutyltin)$_{2.0}$[(pentaerythritol)$_{1.0}$ (pelargonate)$_{1.8}$(mercaptopropionate)$_{1.75}$]$_{1.6}$(phenoxyethylthioglycolate)$_{1.2}$ A mixture of 125 grams dibutyltin oxide, 63 grams phenoxyethylthioglycolate and 230 grams polymercaptoester from Example 26 was heated for two hours at 100° C. in the presence of refluxing benzene. During this time, 7 ml. of water was removed from the reaction. Evaporation of benzene solvent with nitrogen purge and reduced pressure and filtration left 410 grams of a yellow oil product with specific gravity (25° C.) 1.179. Calculated tin content=14.3 weight percent.

EXAMPLE 28

Preparation of poly(dibutyltin)$_{2.0}$[(pentaerythritol)$_{1.0}$ (pelargonate)$_{1.75}$(mercaptopropionate)$_{1.75}$]$_{1.6}$(n-dodecylmercaptide)$_{1.2}$ A mixture of 125 grams dibutyltin oxide, 230 grams polymercaptoester from Example 26 and 61 grams primary n-dodecyl mercaptain was heated for two hours at 100° C. in the presence of refluxing benzene. During that time, 7 ml. of water was removed from the reaction. Evaporation of benzene and filtration left 409 grams of a pale yellow product with specific gravity (25° C.) of 1.130 and viscosity (25° C.) of 1508 cs. Calculated tin content=14.4 weight percent.

EXAMPLE 29

Preparation of poly(dibutyltin)$_{2.0}$[(pentaerythritol)$_{1.0}$ (pelargonate)$_{1.75}$(mercaptopropionate)$_{1.75}$]$_{1.14}$(n - dodecyl mercaptide)$_{2.0}$ A mixture of 125 grams dibutyltin oxide, 165 grams polymercaptoester from Example 26 and 105 grams primary n-dodecyl mercaptan was heated for two hours at 100° C. in the presence of refluxing benzene. During that time, 7 ml. of water was removed from the reaction. Evaporation of benzene and filtration left 388 grams of a pale yellow oil having a specific gravity (25° C.) of 1.082 and viscosity (25° C.) of 193 cs. Calculated tin content=15.2 weight percent.

EXAMPLE 30

Preparation of poly(dibutyltin)$_{2.0}$[(pentaerythritol)$_{1.0}$ (pelargonate)$_{1.8}$(mercaptopropionate)$_{1.75}$]$_{1.6}$(isooctylthioglycolate)$_{1.2}$ A mixture of 125 grams dibutyltin oxide, 230 grams polymercaptoester from Example 26 and 63 grams isooctylthioglycolate was heated for two hours at 100° C. in the presence of refluxing benzene. During that time, 7 ml. of water was removed from the reaction. Evaporation of benzene and filtration of the residue left 405 grams of a pale yellow oil having a specific gravity of 1.143 (at 25° C.) and viscosity (25° C.) of 982 cs. Calculated tin content=14.6 weight percent.

EXAMPLE 31

Preparation of poly(dibutyltin)$_{2.0}$[(pentaerythritol)$_{1.0}$ (pelargonate)$_{2.0}$(mercaptopropionate)$_{1.8}$]$_{1.1}$(phenoxyethylthioglycolate)$_{2.0}$ A mixture of 125 grams dibutyltin oxide, 170 grams polymercaptoester from Example 26 and 110 grams phenoxyethylthioglycolate was heated for three hours at 110° C. in the presence of refluxing benzene. During that time, 8 ml. of water was removed from the reaction. Evaporation of benzene and filtration of the residue left 399 grams of a pale yellow oil with specific gravity (25° C.) of 1.206 and viscosity (25° C.) of 300 cs. Calculated tin content—15 weight percent.

The stabilizing compositions produced in Examples 22–31 were subjected to oven testing in a manner similar to the oven testing of the products of Examples 6–21 as reported in Table I, except that the tests were carried out at a temperature of 375° F. for a total period of 100 minutes. In Table II the results of these latter tests are tabulated and a number system is used to indicate color shadings resulting from thermal degradation. Also the tin content of all samples, including the reference sample, is set forth for comparison purposes.

provide illustrations of typical practice of the invention, it will be apparent that various modifications in the cited reactants and reaction conditions can be made without departure from the basic principles of the invention. All such modifications are deemed to be circumscribed by the spirit and scope of the invention except as the same may be necessarily limited by the appended claims or reasonable equivalents thereof.

What is claimed is:

1. A heat stable vinyl halide resin composition including a stabilizing amount of a condensation polymer of the formula

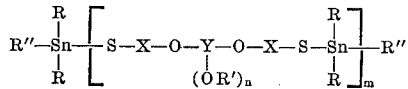

TABLE II

| Example[1] No. | Compound composition Parts | Parts PVC[2] | Mineral oil | Oven stability tests,[3] minutes at 375° F. | | | | | | | | | | Stabilizer tin content, weight percent calculated |
|---|---|---|---|---|---|---|---|---|---|---|---|---|---|---|
| | | | | 10 | 20 | 30 | 40 | 50 | 60 | 70 | 80 | 90 | 100 | |
| 22 | 2 | 100 | 1.5 | 0 | 1 | 1 | 2 | 2 | 2 | 3 | 3+ | 3+ | 4 | 18.2 |
| 23 | 2 | 100 | 1.5 | 0 | 1 | 1 | 2 | 2 | 3 | 3 | 4 | 5 | ------ | 15.1 |
| 24 | 2 | 100 | 1.5 | 0 | 1 | 1 | 2 | 2 | 2 | 3 | 3+ | 4 | 5 | 17.8 |
| 25 | 2 | 100 | 1.5 | 0 | 1 | 1 | 2 | 2 | 2 | 3 | 3+ | 4 | 5 | 18.1 |
| Reference[4] | 2 | 100 | 1.5 | 0 | 1 | 2 | 2 | 2 | 3 | 4 | 5 | ------ | ------ | 18.6 |
| 22 | 2 | 100 | 1.5 | 0 | 1 | 1 | 2 | 2 | 2+ | 3 | 3+ | 4 | 5 | 18.2 |
| 23 | 2 | 100 | 1.5 | 0 | ------ | 1 | 2 | 2+ | 3 | 4+ | 5 | ------ | ------ | 15.1 |
| 25 | 2 | 100 | 1.5 | 0 | 1 | 1 | 1+ | 2 | 2+ | 3 | 3+ | 4 | 5 | 18.1 |
| 27 | 2 | 100 | 1.5 | 0 | 1 | 1+ | 2 | 2 | 3 | 4 | 5 | ------ | ------ | 14.3 |
| 28 | 2 | 100 | 1.5 | 0 | 2 | 2 | 2 | 2+ | 3 | 4 | 5 | ------ | ------ | 14.4 |
| 29 | 2 | 100 | 1.5 | 0 | 2 | 2 | 2 | 2+ | 3 | 4 | 5 | ------ | ------ | 15.2 |
| 30 | 2 | 100 | 1.5 | 0 | 1 | 2 | 2 | 2+ | 3 | 4 | 5 | ------ | ------ | 14.6 |
| Reference | 2 | 100 | 1.5 | 0 | 1 | 1+ | 2 | 2 | 2 | 3 | 4 | 5 | ------ | 18.6 |
| 24 | 2 | 100 | 0.5 | 0 | 1 | 1 | 1+ | 2 | 2 | 3 | 3 | 3+ | 5 | 17.8 |
| 27 | 2.65 | 100 | 0.5 | 0 | + | 1 | 1+ | 2 | 2 | 3 | 3++ | 3+ | 5 | 14.3 |
| 29 | 2.5 | 100 | 0.5 | + | 1 | 1+ | 2 | 2 | 2 | 3 | 3+ | 4 | 5 | 15.2 |
| 31 | 2.45 | 100 | 0.5 | 0 | + | 1 | 1+ | 2 | 2 | 3 | 3 | 3+ | 5 | 15.1 |
| 31 | 2 | 100 | 0.5 | 0 | 1 | 1+ | 2 | 2 | 3 | 3+ | 4 | 5 | ------ | 15.1 |
| Reference | 2 | 100 | 0.5 | 0 | 1 | 1+ | 2 | 2 | 3 | 3+ | 4 | 5 | ------ | 18.6 |
| 27 | 2 | 100 | 0.5 | + | 1+ | 1+ | 2 | 2 | 3+ | 5 | ------ | ------ | ------ | 14.3 |
| 28 | 2 | 100 | 0.5 | + | 1 | 1 | 2 | 3 | 4 | 5 | ------ | ------ | ------ | 14.4 |
| 29 | 2 | 100 | 0.5 | 1 | 1+ | 1+ | 2 | 2 | 3+ | 5 | ------ | ------ | ------ | 15.2 |
| 31 | 2 | 100 | 0.5 | 0 | 1 | 1 | 2 | 2 | 3 | 4 | 5 | ------ | ------ | 15.1 |
| Reference | 2 | 100 | 0.5 | 0 | 1 | 1 | 2 | 2 | 3 | 4 | 4+ | 5 | ------ | 18.6 |

[1] Refers to the condensation polymers produced in the several examples hereinbefore set forth.
[2] Refers to simple poly(vinyl chloride) homopolymer formulation used in the tests.
[3] Numbers represent increasing color: 0=colorless, 1=first noticeable yellow, 5=black.
[4] The reference stabilizing composition used was dibutyltin-S,S-bis(isooctylthioglycolate).

From the tabulated data in Tables I and II, it will be apparent that the stabilizing compositions of the present invention are highly effective in their thermal stabilizing properties for polyhaloresins. As previously indicated, the processing characteristics, such as fusion time and lubricity, of the stabilized polyvinyl chloride formulations can be controlled and selectively varied by varying the structure of the stabilizer additive. This selective variation of processing characteristics, however, has been found to be independent of the tin content of the formulations.

The stabilizing compositions of the invention can be utilized in a widely varying range of concentration in the stabilization of resins derived from polyvinyl halide resins, such range embracing from about 0.1 weight percent to about 10 weight percent. While this range is operative in the case of the polyvinyl halide resins, it is here preferable to use the stabilizers in concentrations of from about 0.5 weight percent to about 5 weight percent, and most preferably from about 1.5 to about 3 weight percent.

In addition to the incorporation of the stabilizing compounds of the invention in resinous formulations of the type described, these formulations may also contain conventional plasticizer materials, such as phthalates, adipates and epoxy esters, lubricants such as calcium stearate, hydrocarbon waxes, polyethylene synthetic diamide based waxes, pigments and colorants as well as processing or impact modifiers such as ABS resins, acrylates, chlorinated polyethylenes, hydrocarbon resins, etc.

Although certain specific embodiments and examples of the invention have been described herein in order to wherein X is an alkylene-substituted acyl radical in which alkylene contains from 1 to 6 carbon atoms, Y is a saturated aliphatic hydrocarbon radical containing from 3 to 11 carbon atoms, $m$ is a whole number greater than 1, $n$ is a number from 1 to 6, R is alkyl of 4 to 8 carbon atoms, R' is selected from the group consisting of hydrogen and an acyl radical derived from an organic acid selected from the group consisting of a saturated aliphatic monocarboxylic acid and an aromatic monocarboxylic acid, and R'' is the residue formed by the removal of acidic hydrogen from a member selected from the group consisting of an alkyl mercaptan, a mercaptoalkanoic acid, a mercaptoalkanoic acid ester, an aliphatic monocarboxylic acid, and an aromatic monocarboxylic acid.

2. A heat stable vinyl halide resin composition containing from about 0.1 to about 10 weight percent of the composition defined in claim 1.

3. The composition of claim 1 wherein the stabilizer is poly(dibutyltin)$_{2.0}$ (pentaerythritol pelargonate benzoate dithioglycolate)$_{1.0}$(isooctylthioglycolate)$_{2.0}$, the numerals indicating molar proportions.

4. The composition of claim 1 wherein the stabilizer is poly(dibutyltin)$_{2.0}$[(pentaerythritol)$_{1.0}$ (pelargonate$_{2.0}$ (mercaptopropionate)$_{1.8}$] $_{1.1}$ (phenoxyethylmercaptopropionate)$_{2.0}$, the numerals indicating molar proportions.

5. The composition of claim 1 wherein the stabilizer is poly(dibutyltin)$_{2.0}$ [(pentaerythritol)$_{1.0}$ (pelargonate)$_{1.75}$ (mercaptopropionate)$_{1.75}$]$_{1.14}$ (n-dodecylmercaptide)$_{2.0}$, the numeral indicating molar proportions.

6. The composition of claim 1 wherein the stabilizer is poly(dibutyltin)$_{2.0}$ trimethylolpropane pelargonate di(thioglycolate)]$_{1.0}$ (phenoxyethylthioglycolate)$_{2.0}$, the numeral indicating molar proportions.

7. A composition of matter according to claim 1 wherein R" consists of a mercaptoester radical produced by the esterification of a mercaptoalkanoic acid and a monfunctional alcohol.

8. A composition of matter according to claim 7 wherein the mercaptoalkanoic acid is mercaptopropionic acid and the monofunctional alcohol is selected from the group comprising isooctanol and phenoxyethanol.

References Cited

UNITED STATES PATENTS

| 2,641,588 | 6/1953 | Leistner et al. | 260—45.75 |
| 2,648,650 | 8/1953 | Weinberg et al. | 260—30.6 |
| 3,158,576 | 11/1964 | Rudel et al. | 252—48.6 |
| 3,282,784 | 11/1966 | Gordon et al. | 167—65 |

FOREIGN PATENTS

| 1,382,594 | 11/1964 | France. |
| 1,027,781 | 4/1966 | Great Britain. |

DONALD E. CZAJA, Primary Examiner

V. P. HOKE, Assistant Examiner

U.S. Cl. X.R.

260—476, 491, 398, 23, 429.7